US012680345B2

(12) United States Patent
Fernandez et al.

(10) Patent No.: US 12,680,345 B2
(45) Date of Patent: Jul. 14, 2026

(54) CYLINDRICAL LOCK WITH MOTOR-DRIVEN LATCH

(71) Applicant: Command Access Technology, Inc., Yorba Linda, CA (US)

(72) Inventors: Carlos Fernandez, Anaheim, CA (US); Parssa Sabouhi, Corona, CA (US); Agustin Valadez, Fullerton, CA (US); Lutz Mueller, Glendale, CA (US)

(73) Assignee: Command Acess Technology, Inc., Yorba Linda, CA (US)

( * ) Notice: Subject to any disclaimer, the term of this patent is extended or adjusted under 35 U.S.C. 154(b) by 8 days.

(21) Appl. No.: 18/676,157

(22) Filed: May 28, 2024

(65) Prior Publication Data

US 2024/0410208 A1 Dec. 12, 2024

Related U.S. Application Data

(60) Provisional application No. 63/472,240, filed on Jun. 9, 2023.

(51) Int. Cl.

*E05B 47/02* (2006.01)
*E05B 47/00* (2006.01)
*E05B 55/00* (2006.01)

(52) U.S. Cl.

CPC ........ *E05B 47/026* (2013.01); *E05B 47/0012* (2013.01); *E05B 55/005* (2013.01); *E05B 2047/0024* (2013.01); *E05B 2047/0026* (2013.01); *E05B 2047/0067* (2013.01); *E05B 2047/0087* (2013.01)

(58) Field of Classification Search

CPC .. E05B 47/0012; E05B 47/026; E05B 55/005; E05B 2047/0017; E05B 2047/0024; E05B 2047/0085; E05B 2047/0086; E05B 2047/0087; E05B 2047/0026; Y10T 292/0969; Y10T 292/0974; Y10T 292/1015; Y10T 292/1021

See application file for complete search history.

(56) References Cited

U.S. PATENT DOCUMENTS 2,613,094 A * 10/1952 Schlage ................ E05B 63/044 292/1.5
3,340,710 A 9/1967 O'brien
4,685,709 A 8/1987 Kambic
4,810,014 A * 3/1989 McGourty .......... E05B 47/0012 292/144
5,862,692 A 1/1999 Legault et al.
6,212,923 B1 4/2001 Clark
7,263,865 B2 9/2007 Miller et al.
7,966,854 B2 6/2011 Imedio
8,494,680 B2 7/2013 Sparenberg et al.
8,727,392 B2 5/2014 Greiner et al.
9,181,730 B1 11/2015 Peng
(Continued)

*Primary Examiner* — Christine M Mills
*Assistant Examiner* — Peter H Watson
(74) *Attorney, Agent, or Firm* — Larry K. Roberts

(57) ABSTRACT

A cylindrical lock with a latch bolt, including an electro-mechanical mechanism enabling pull-back of the latch bolt to a retracted position. In an exemplary embodiment, the electro-mechanical mechanism includes an electrically powered motor and a drive linkage system coupling the motor to the latch bolt, the electro-mechanical mechanism configured to fit within a cylindrical hole formed in a door.

12 Claims, 10 Drawing Sheets

(56) References Cited

U.S. PATENT DOCUMENTS

| | | | | |
|---|---|---|---|---|
| 9,212,505 | B2 | 12/2015 | Geng et al. | |
| 10,738,507 | B2 | 8/2020 | Gopalakrishnan et al. | |
| 10,829,959 | B2 | 11/2020 | Lowder | |
| 11,187,012 | B2 | 11/2021 | Ellis et al. | |
| 11,795,731 | B2 | 10/2023 | Carpenter et al. | |
| 2012/0169453 | A1 * | 7/2012 | Bryla | E05C 1/08 340/3.1 |
| 2014/0183881 | A1 * | 7/2014 | Armari | E05B 47/0012 292/229 |
| 2018/0340351 | A1 * | 11/2018 | Harkonen | H02J 7/0068 |
| 2023/0134746 | A1 * | 5/2023 | Chen | E05B 63/08 70/277 |

* cited by examiner

CYLINDRICAL LOCK WITH MOTOR-DRIVEN LATCH

CROSS-REFERENCE TO RELATED APPLICATIONS

This application claims the benefit of U.S. Provisional Patent Application No. 63/472,240, filed Jun. 9, 2023, the entire contents of which are incorporated herein by this reference.

BACKGROUND OF THE INVENTION

This invention is directed to cylindrical locks, and more particularly to a system for providing a motor-driven latch.

A cylindrical lock is installed through an opening drilled through the door. To applicant's knowledge, an electrically powered latch for a cylindrical lock has not been available. This invention addresses this need, in a reliable and cost-effective manner.

BRIEF DESCRIPTION OF DRAWINGS

Features and advantages of the disclosure will readily be appreciated by persons skilled in the art from the following detailed description when read in conjunction with the drawings wherein.

DETAILED DESCRIPTION OF THE INVENTION

Figure 1A:
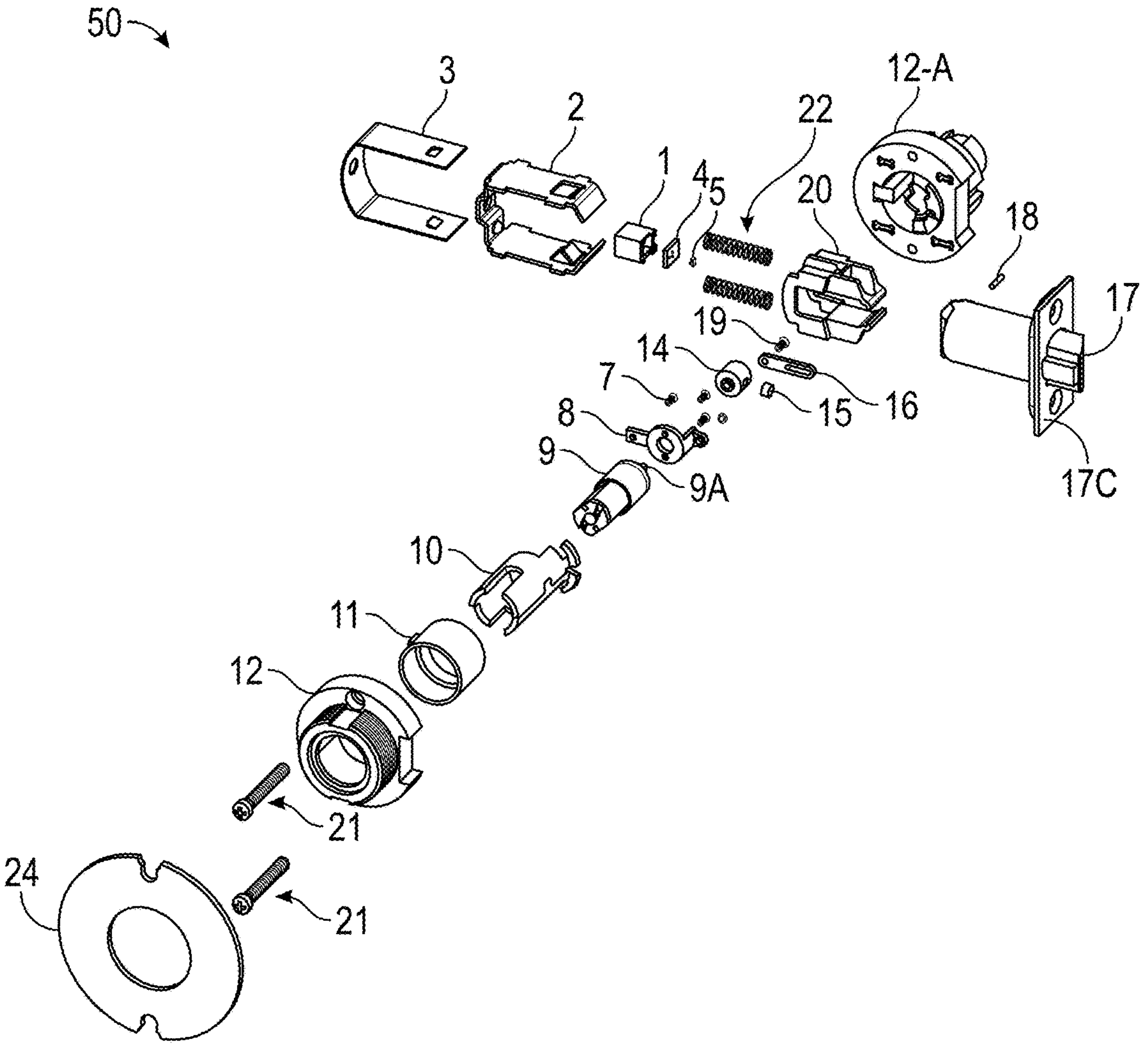
FIG. 1A is an exploded isometric view of an exemplary embodiment of a cylindrical lock system with an electrified latch bolt retraction system.
Figure 1B:
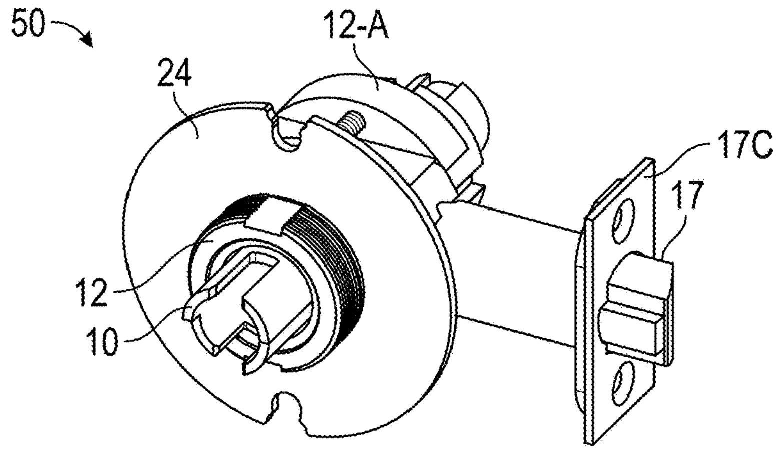
FIGS. 1B and 1C are isometric views of the cylindrical lock system as in FIG. 1A, in assembled form.
Figure 1C:
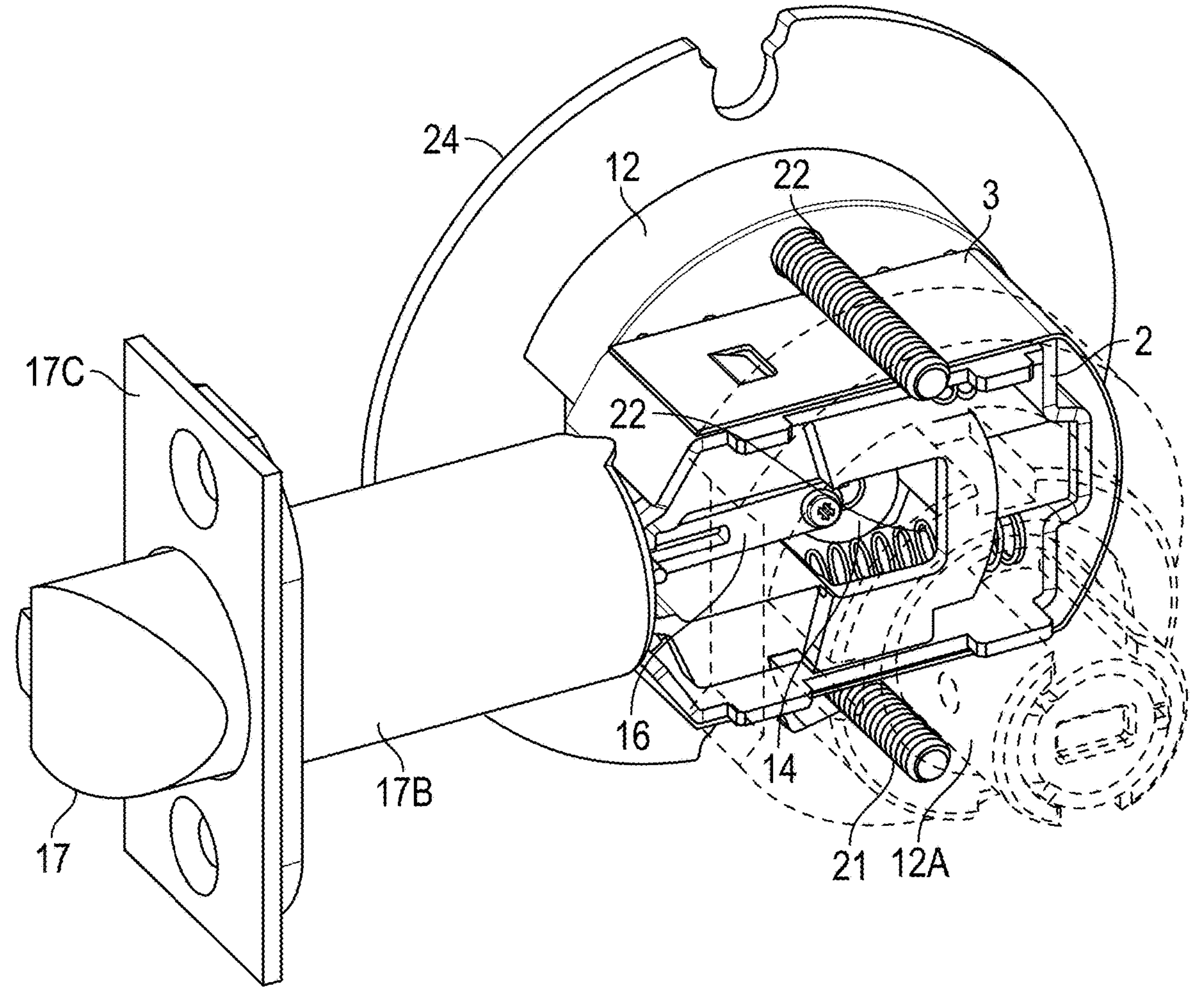
Figure 2A:
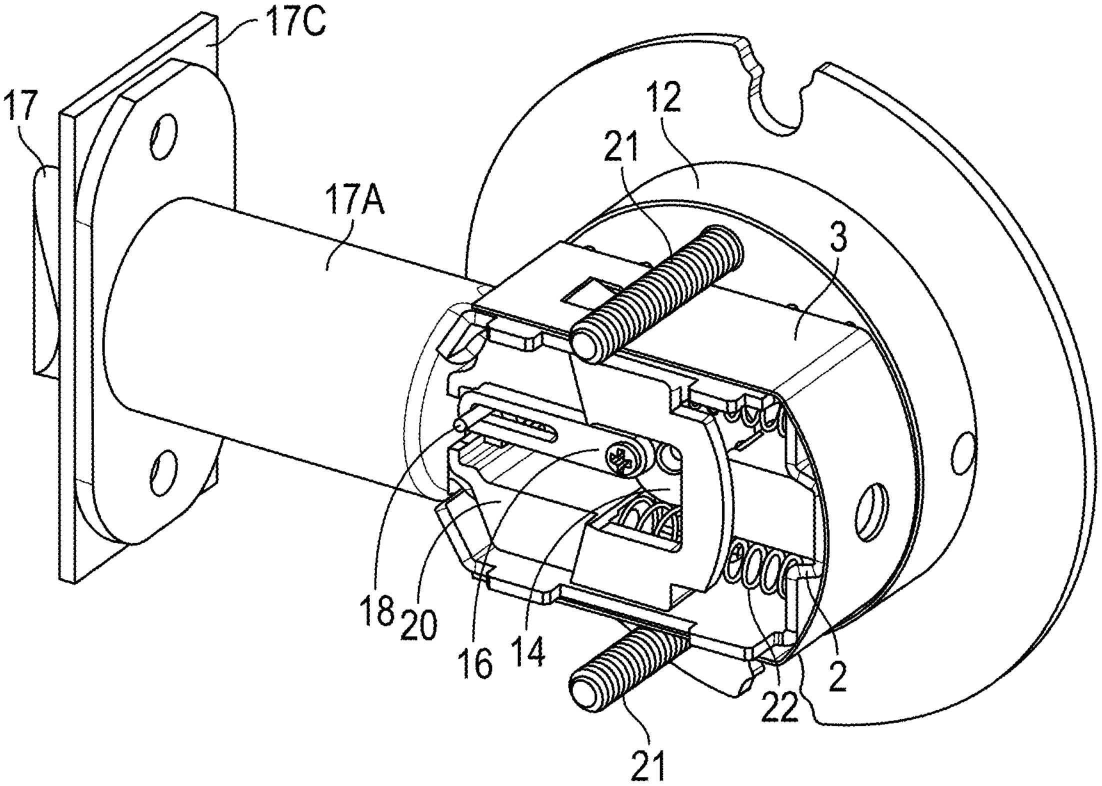
FIG. 2A is an isometric view of the cylindrical lock mechanism of FIG. 1A, showing details of the linkage to the latch bolt pin interface.
Figure 2B:
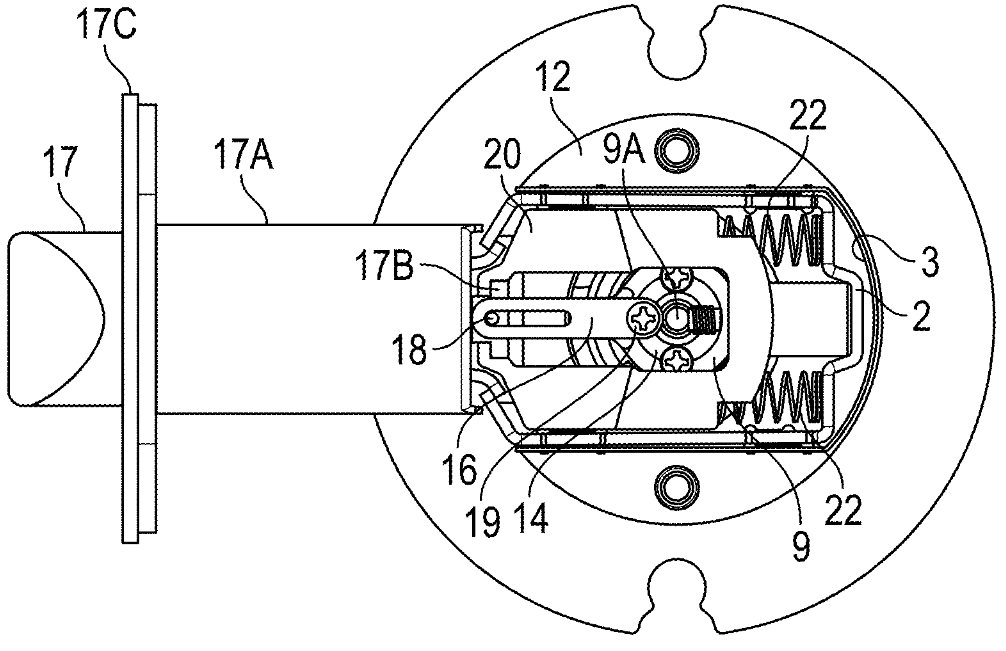
FIG. 2B is a front plan view of the mechanism of FIG. 2A, in front plan view.

In the following detailed description and in the several figures of the drawing, like elements are identified with like reference numerals.

FIGS. 1A-4I illustrate an exemplary embodiment of a cylindrical lock 50 with a motor-driven latch bolt in accordance with an aspect of the invention. The lock includes an electro-mechanical mechanism enabling the pull-back of the latch bolt to a retracted position. The internal parts of the lock are mounted to/within an inner hub 12 and outer hub 12-A, which are secured in assembled configuration by threaded fasteners 21. A flange 24 is fitted to the inner hub 12. The internal parts include a DC brushed gear motor 9, which is fitted in spindle 10, which in turn fits within hub sleeve 11. A motor mounting bracket 8 is secured to the hub sleeve (11), which is in turn keyed to the inside hub 12.

The latch bolt assembly includes latch bolt 17, fitted within outer cylindrical housing 17A. A latch bolt link 17B is connected to the latch bolt, and a distal end is connected to a latch end of latch moving bracket 16 by dowel pin 18. End plate 17C is connected to the housing 17A.

A magnet holder crank 14 is mounted to the shaft 9A of motor 9, and holds magnet 15. A motor end of the latch moving bracket 16 is attached to the periphery of the magnet holder crank by threaded fastener 19.

A slide structure 20 is fitted within slide holder 2, which in turn is fitted into slide cover 3. Compression springs 22 are positioned between the slide structure and the slide holder, biasing the slide structure 20 towards the end plate 17C so the latch bolt 17 is in the locked position.

A PCB holder 1 is attached to the slide holder 2, holding PCB 4 and a Hall effect position sensor 5, positioned to sense the magnet 15 mounted to the periphery of the magnet holder 14 when the latch bolt 17 has been moved to the retracted position.

In operation, the brushed DC motor 9 drives magnet holder crank 14 connected to the latch moving bracket 16, to retract the latch bolt 17 of the cylindrical lock.

Figure 3:
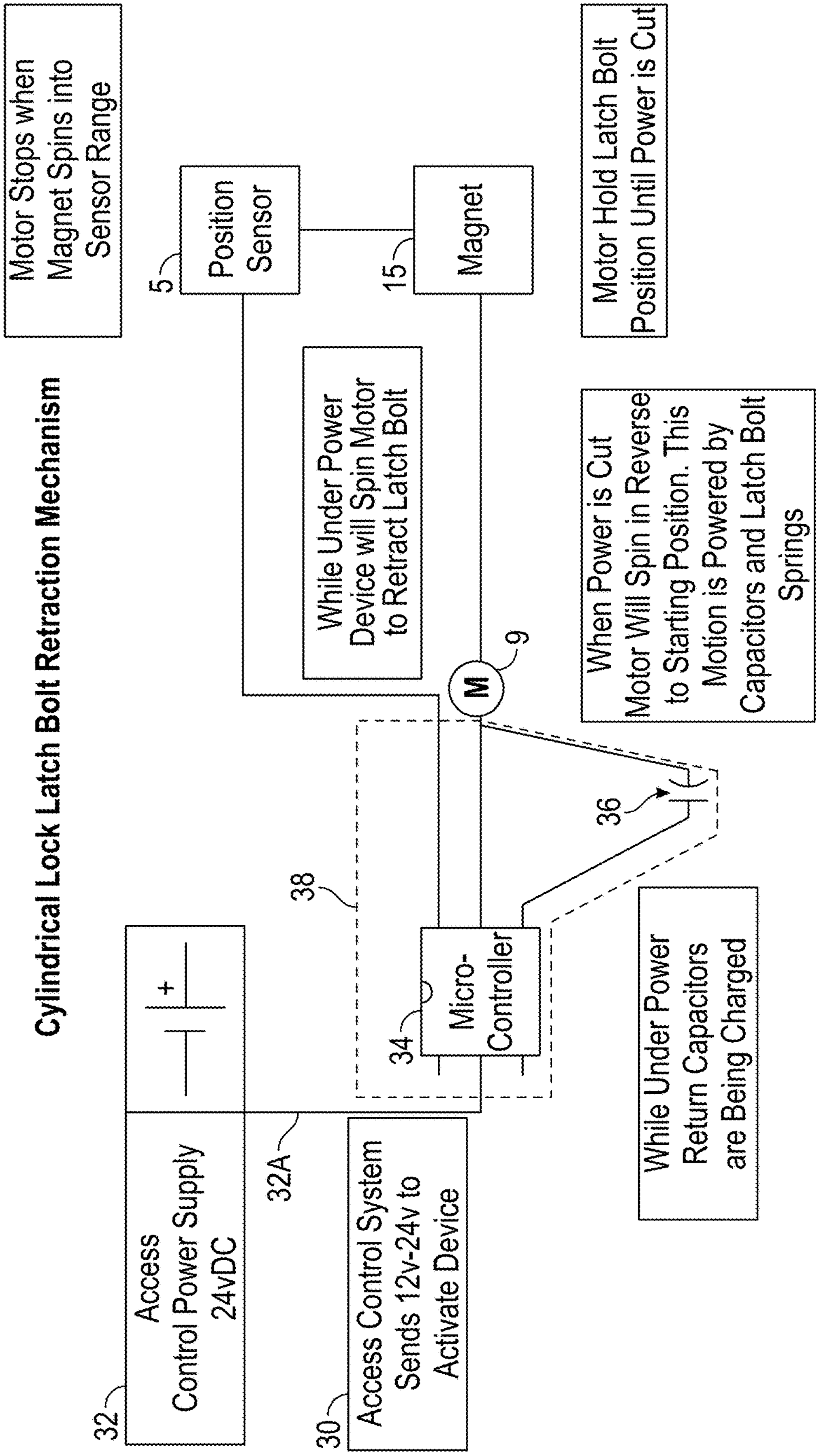
FIG. 3 is a simplified schematic diagram of the control for actuating the cylindrical lock mechanism of FIG. 1A, and illustrating a logic flow of operation.

Referring to FIG. 3, an exemplary embodiment of a control scheme includes a control module 38, which in this embodiment includes a microcontroller 34 with a built-in motor driver, and position sensor 5 for sensing magnet 15.

The exemplary embodiment of the mechanism described herein involves a brushed DC motor 9 that drives a crank (i.e. the magnet holder crank 14) and latch moving bracket 16 to retract the latch bolt 17 of the cylindrical lock. The mechanism includes two main aspects:

1. Cylindrical lock with latch bolt pull-back functionality. The electro-mechanical mechanism is a cylindrical lock that includes an electrical mechanism enabling the pull back of the latch bolt. This feature distinguishes it from conventional cylindrical locks, which do not have any electrically-operated latch retraction features of any kind.
2. Utilization of the crank link mechanism: The mechanism achieves the retraction of the latch bolt through the implementation of a crank (magnet holder crank 14) and the latch moving bracket 16. The specific design and operation of this crank link mechanism form a unique aspect of this invention.

Figure 5:
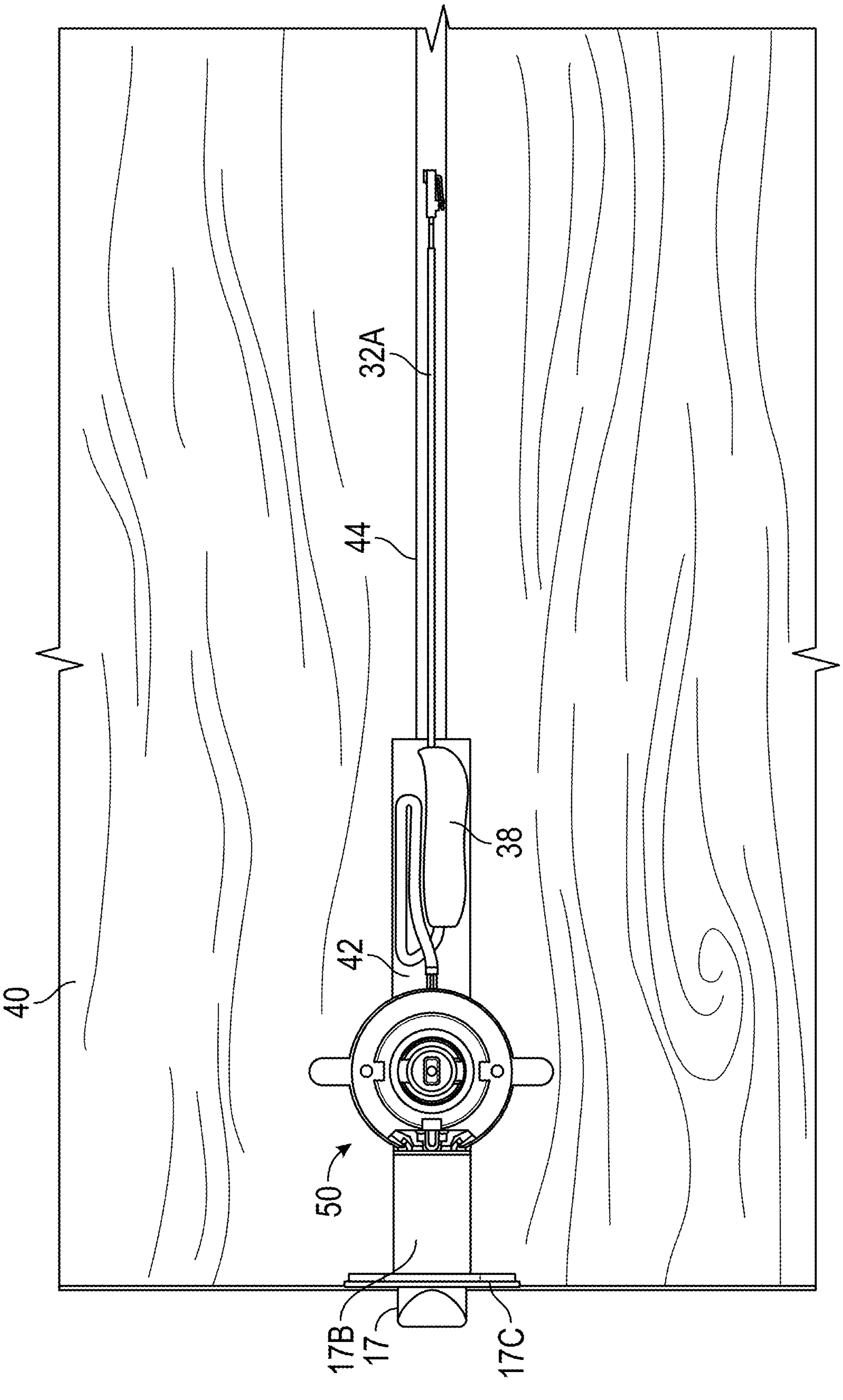
FIG. 5 depicts a portion of a door in which the lock is installed and depicting a hollow pocket in which the control module is located.

The control scheme of the lock system involves a control module and a magnet position sensor 5. FIG. 3 is a simplified schematic and logic flow diagram of features of the system 50. The control module 38 includes microcontroller 34 and return capacitors 36. Control of the lock is by an access control system 30, including, by way of example only, a card key, or manual switch. When actuated by the access control system, an access control power supply 32 provides 24 VDC via wiring 32A to control module 34 which in turn provides low voltage DC drive signals to the motor 9. Electrical power to the lock system 50 can be through wire conductors 44 fed through a door hinge and then through passageways 44 formed in the door to the cylindrical lock 50. Return capacitors 36 (in this exemplary embodiment, two capacitors in series) are connected between the microcontroller 34 and the motor 9. The control module and capacitors will typically be mounted in a hollowed-out pocket 42 in the door beside the lock 50. FIG. 5 illustrates a cut-away portion of a door 40 in which the lock 50 is installed, showing the hollow pocket 42 in which the control module 38 is located. In other embodiments, the control module and capacitors may be mounted at other locations, e.g. at or near the access control system.

When the control module 38 is powered up, low voltage DC is applied to the motor 9, and the motor shaft 9A rotates until the sensor 5 indicates that the retracted position is reached. The magnet sensor (hall effect sensor) 5 will spike in voltage when the magnet 15 is in range. The control module 38 is tuned so a specific voltage limit corresponds with a fully retracted latch position. Once the motor reaches its fully retracted position, the microcontroller 34 is programmed to cut the power to the motor gearbox. The mechanism will keep that position due to the motor and gear friction from the motor gearbox and the angle of the springs 22 and linkage 16 making minimal torque.

Thus, when the access control system through its power supply (32) sends a 24VDC signal to the control module, the control module 38 is powered up, and in turn will power the motor 9 until the motor position reaches full retraction. The retracted position is determined by magnet 15 on the motor spindle and the magnetic hall effect sensor 5, which act as a limit switch. Once the magnet 15 is within range, indicated by the control module detecting a predetermined voltage limit from the hall effect sensor 5, the limit switch will trip, and the control module will cut power to the motor 9. The motor will stop and hold its position due to the friction in the motor assembly and gearbox assembly. Furthermore, in the fully retracted position, the spring and link mechanism are configured to impart a neutral force to the motor assembly. No torque is being applied due to the motor position and linkage angle. For this reason, motor and gearbox friction are sufficient to hold the mechanism in place. It will remain in place as long as the access control system continues to send a 24VDC open signal to the control module. Once the 24VDC open signal to the control module is cut, the control module will initiate a return sequence powered by the reserve energy bank in the capacitors 36. The motor will spin in the reverse direction for a predetermined duration under power from the capacitor charge, and with assistance from the springs and linkage mechanism, it will return the lock to the extended and latching position.

Figure 4A:
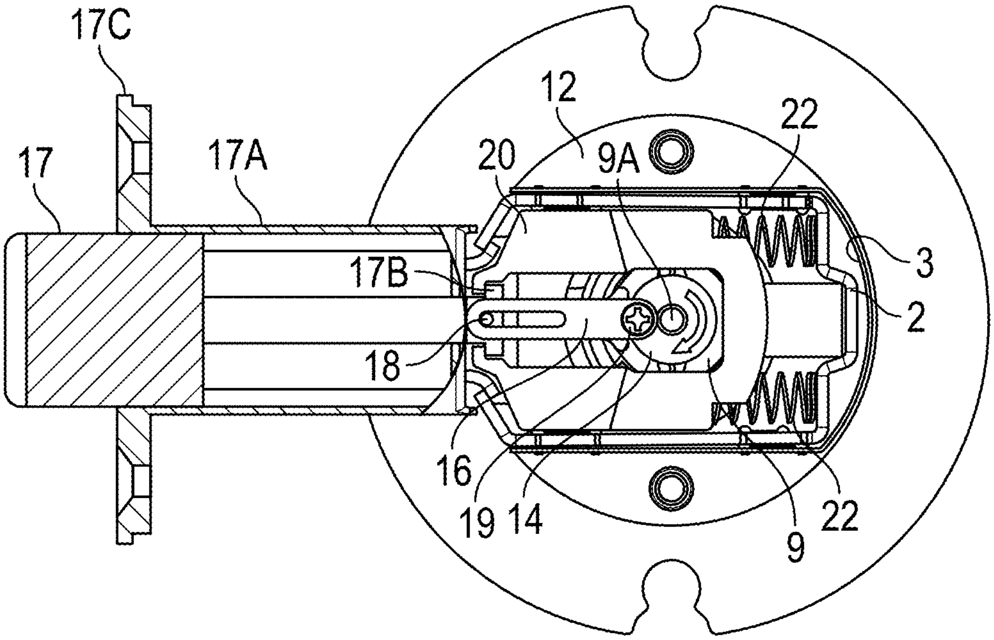
FIGS. 4A, 4B, 4C, 4D, 4E, 4F, 4G, 4H and 4I are plan cross-sectional views, similar to FIG. 2B, but with the cross-section taken to show internal features of the latch bolt and the linkage to the motor drive system, showing different states of the latch bolt and motor drive assembly as the cylindrical lock moves from a locking state to an unlocked state and returning to the locking state.
Figure 4B:
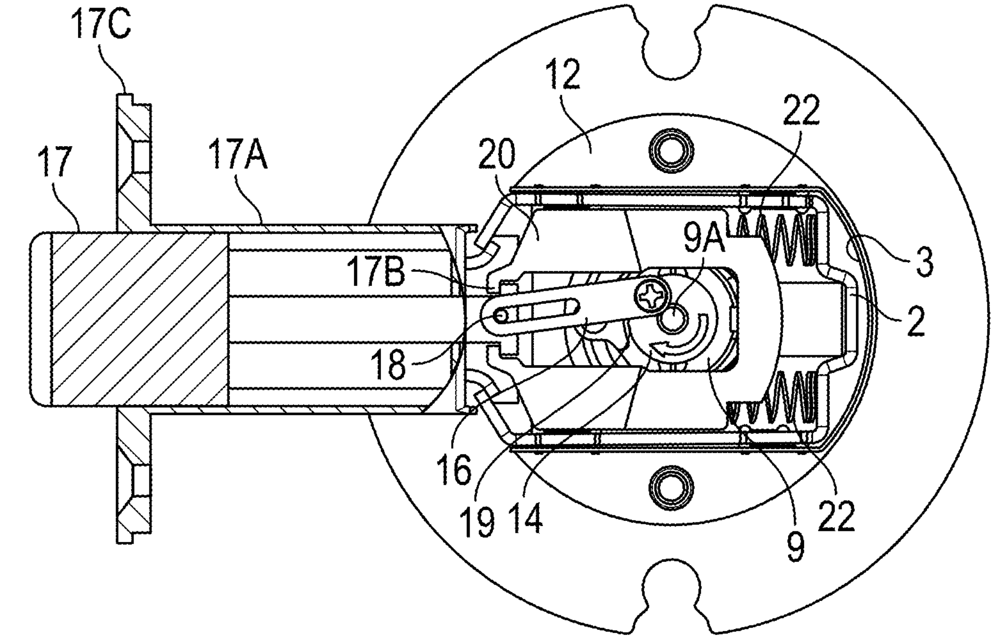
Figure 4C:
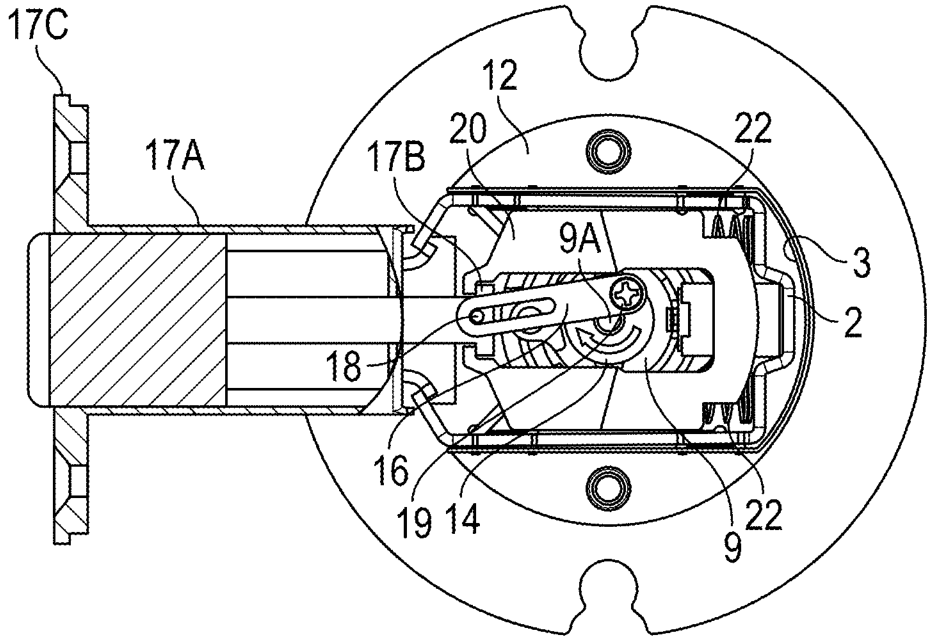
Figure 4D:
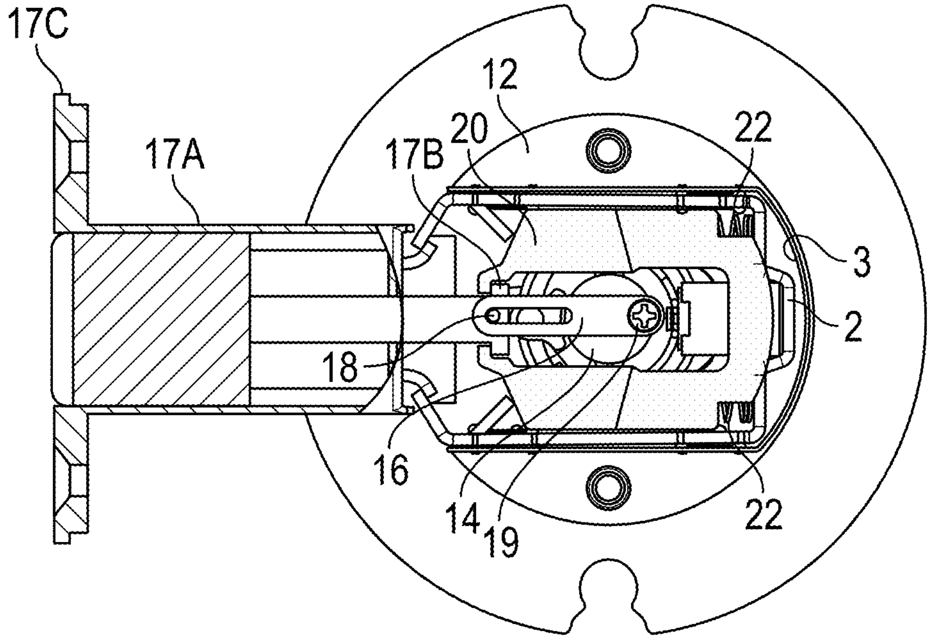
Figure 4E:
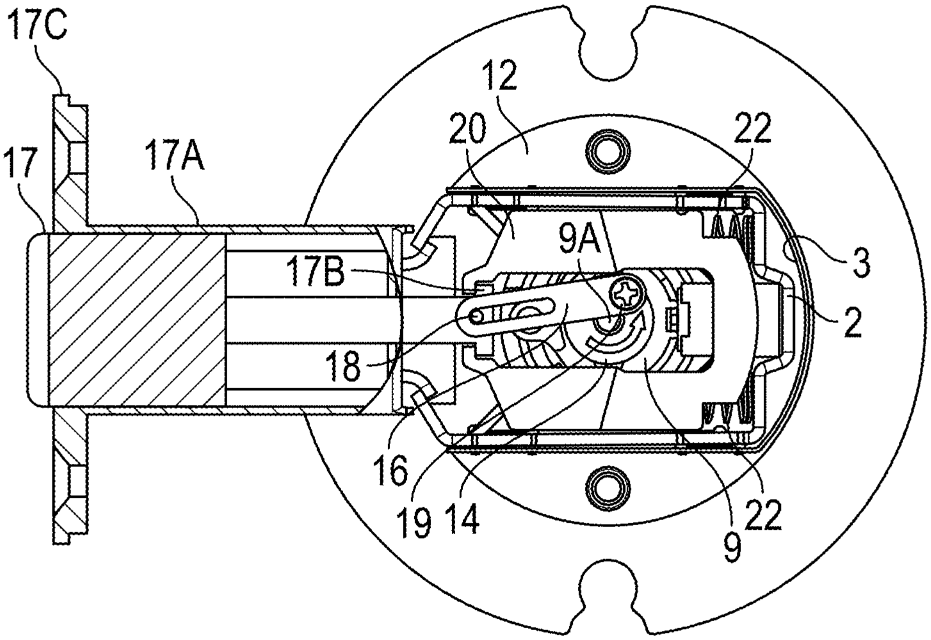
Figure 4F:
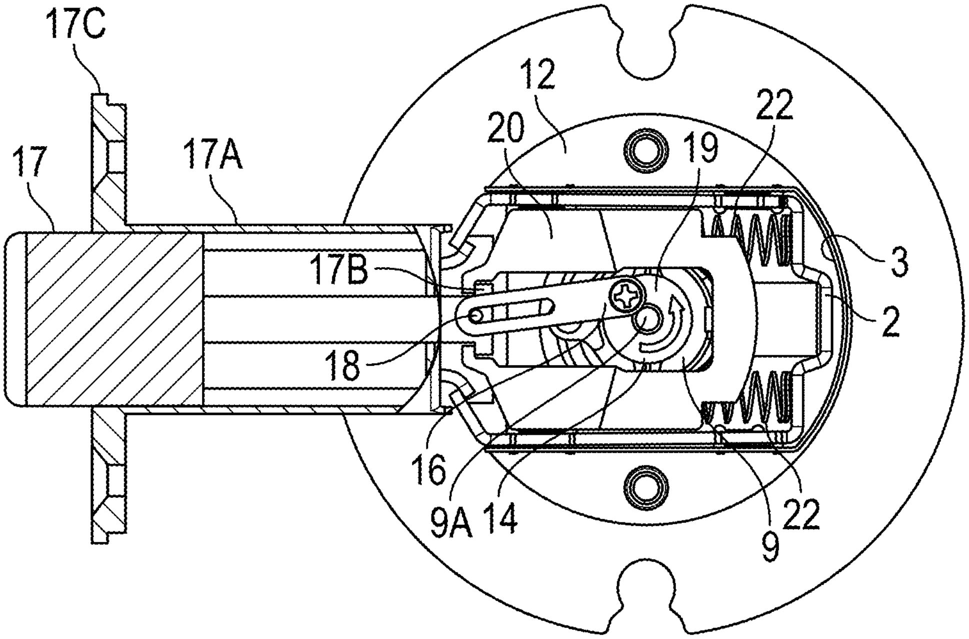
Figure 4G:
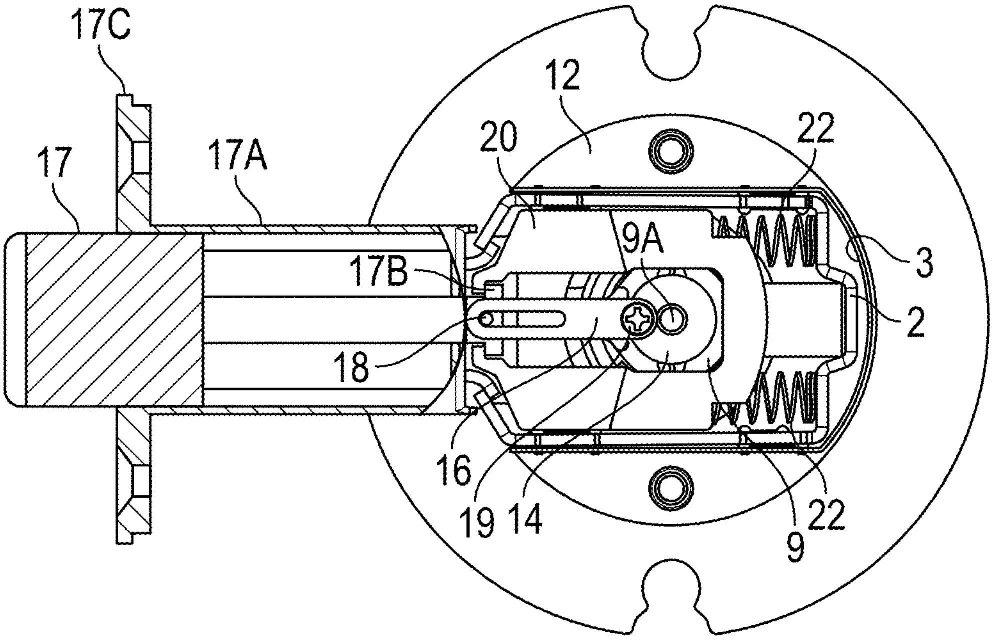
Figure 4H:
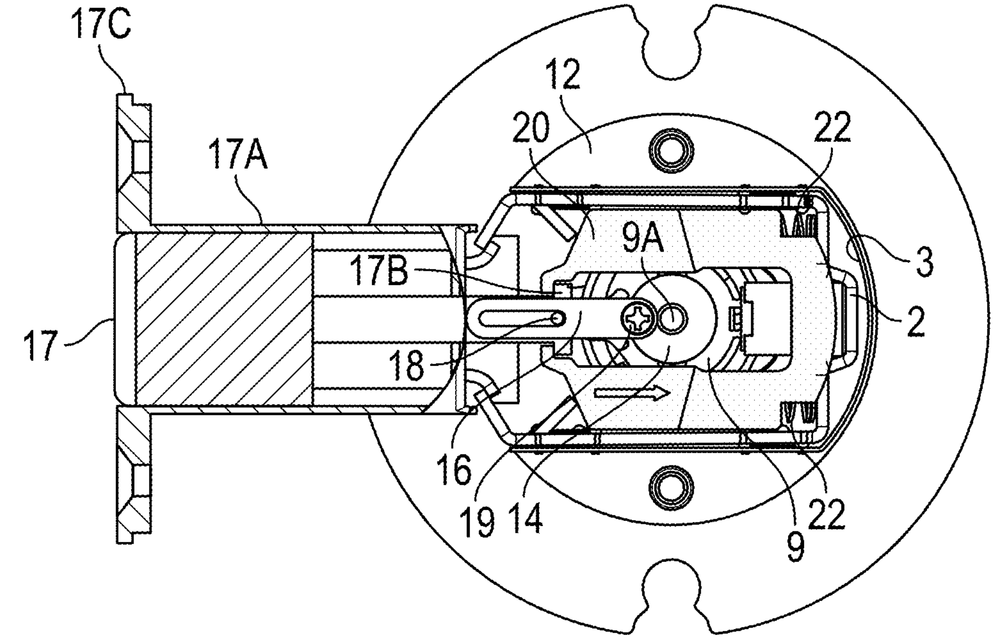
Figure 4I:
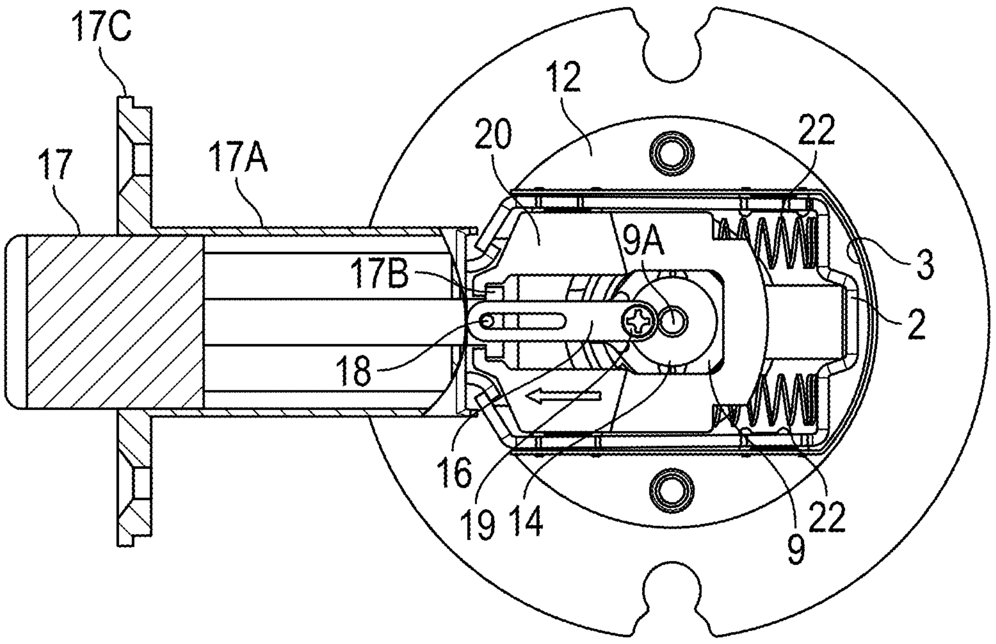

In an exemplary embodiment, the operation of the cylindrical lock system follows the steps outlined below, and as illustrated in the schematic diagram of FIG. 3:

1. Starting position: The latch bolt 17 is in the locking state initially, as illustrated in FIGS. 1C, 2A, 2B and 4G.
2. The access control system 30 sends a 24 VDC signal to activate the cylindrical lock system, initiating its operation (FIG. 4A). In an exemplary embodiment, the control module is only powered when the access control system 30 sends an activation voltage of 24 VDC.
3. While the system 50 is powered, the return capacitors 36 begin to charge, storing electrical energy.
4. While under power, the motor 9 spins, which in turn drives the crank 14 and latch moving bracket 16 to retract the latch bolt 17 by acting on latch bolt link 17B, as shown in FIG. 4B.
5. The motor and linkage continue to rotate, retracting the latch bolt further (FIG. 4C).
6. The motor 9 is stopped when the magnet 15 enters the sensor 5 range, triggering the position limit (FIG. 4D), and the control module removes power to the motor. The fully retracted position is also shown in FIG. 4H.
7. The sensor detects the magnet 15, indicating that the latch bolt 17 is in the fully retracted position.
8. The motor 9 maintains The position of the latch bolt in the retracted position is maintained until power (fixed 24 VDC) is cut to the controller 34 by the access control system 30. With power applied to the control module, the motor will remain in the latch-bolt-retracted position. When power is removed from the control module, the latch bolt returns to the extended, locked position.
9. When power to the control module is cut, i.e. reduced to zero voltage, the motor shaft spins in reverse, returning to the starting position (FIGS. 4E, 4F, 4G and 4I). This reverse motion is powered by the stored energy in the capacitors and the force of the latch bolt springs.

Although the foregoing has been a description and illustration of specific embodiments of the subject matter, various modifications and changes thereto can be made by persons skilled in the art without departing from the scope and spirit of the invention.

The invention claimed is:

1. A cylindrical lock with a latch bolt for locking an access door, comprising:

a latch bolt assembly comprising a latch bolt and an outer housing, the latch bolt arranged for linear movement between an extended position in which the lock is in a locked state and a retracted position in which the lock is in an unlocked state;

an electro-mechanical mechanism enabling pull-back of the latch bolt from the extended position to the retracted position, the electro-mechanical mechanism comprising an electrically powered motor with a motor shaft and a drive linkage system coupling the motor to the latch bolt to convert rotary motion of the motor shaft to linear motion to electrically power linear movement of the latch bolt, the electro-mechanical mechanism configured to fit within a cylindrical hole or opening formed in a door;

the drive linkage comprising a crank driven by the motor and a latch moving bracket configured to retract the latch bolt of the cylindrical lock from the extended position to the retracted position;

an inner hub and an outer hub;

a hollow spindle coupled to the inner hub and configured to fit within the cylindrical hole or opening; and wherein the motor is fitted within the hollow spindle.

2. The cylindrical lock of claim 1, further comprising:

a control module and one or more return capacitors.

3. The cylindrical lock of claim 2, wherein the electro-mechanical mechanism is configured so that when electrical power to the control module is cut, the motor shaft of the motor spins in reverse, returning the latch bolt to the extended position.

4. The cylindrical lock of claim 3, wherein the reverse motion is powered by the stored energy in said one or more return capacitors and force of one or more latch bolt springs configured to bias the latch bolt to the extended position.

5. The cylindrical lock of claim 2, further including an access control system, and wherein the control module is responsive to a latch retract signal from the access control system and configured to supply drive signals to the motor to retract the latch bolt.

6. The cylindrical lock of claim 2, further comprising:

a position sensor;

a magnet secured to the crank, the crank secured to a shaft of the motor;

wherein said position sensor is responsive to the magnet secured to the crank, and the control module is responsive to the position sensor to sense when the latch is fully retracted from the extended position.

7. The cylindrical lock of claim 6, further comprising a latch bolt link structure extending from the latch bolt, and wherein the latch bolt bracket is coupled to the latch bolt link structure, wherein the crank, latch bolt bracket and latch bolt link structure cooperate to convert rotary motion of the motor shaft into linear motion of the latch bolt.

8. A cylindrical lock with a latch bolt configured for locking an access door, comprising:
- a latch bolt assembly comprising a latch bolt and an outer housing, the latch bolt arranged for linear movement between an extended position in which the lock is in a locked state and a retracted position in which the lock is in an unlocked state;
- an electro-mechanical mechanism enabling pull-back of the latch bolt to a retracted position, the electro-mechanical mechanism configured to fit within a cylindrical hole or opening formed in the access door, the electro-mechanical mechanism comprising:
- an electrically powered motor having a motor shaft;
- an inner hub and an outer hub;
- a hollow spindle coupled to the inner hub and configured to fit within the cylindrical hole or opening;
- wherein the motor is fitted within the hollow spindle;
- a drive linkage system coupling the motor shaft to the latch bolt, the drive linkage system including a crank affixed to the motor shaft and carrying a magnet, a latch moving bracket coupled to the crank and to the latch bolt; and
- a position sensor arranged to sense the presence of the magnet when the latch bolt is at the retracted position; and
- the lock further comprising a control module including a microcomputer responsive to access control signals to activate and provide drive signals to the motor, the microcomputer responsive to the position sensor to stop motor drive signals when the latch bolt is at the retracted position.

9. The cylindrical lock of claim 8, further comprising a latch bolt link structure extending from the latch bolt, and wherein the latch bolt bracket is coupled to the latch bolt link structure, wherein the crank, latch bolt bracket and latch bolt link structure cooperate to convert rotary motion of the motor shaft into linear motion of the latch bolt.

10. A cylindrical lock with a latch bolt configured for an access door, comprising:
- an electro-mechanical mechanism enabling pull-back of the latch bolt to a retracted position, the electro-mechanical mechanism configured to fit within a cylindrical hole or opening formed in the access door, the electro-mechanical mechanism comprising:
- an electrically powered motor having a motor shaft;
- a drive linkage system coupling the motor shaft to the latch bolt, the drive linkage system including a crank affixed to the motor shaft and carrying a magnet, a latch moving bracket coupled to the crank and to the latch bolt; and
- a position sensor arranged to sense the presence of the magnet when the latch bolt is at the retracted position; and
- the cylindrical lock further comprising a control module including a microcomputer responsive to access control signals to activate and provide drive signals to the motor, the microcomputer responsive to the position sensor to stop motor drive signals when the latch bolt is at the retracted position,
- wherein the control module further comprises one or more return capacitors connected between the microcomputer and the motor, such that the return capacitors are charged when the microcomputer is activated by the access control signals, and wherein once the access control signals to the control module are cut, the control module is configured to initiate a return sequence powered by charge stored in the return capacitors, the motor turning in a reverse direction for a predetermined duration under power from the capacitor charge, and with assistance from the springs and linkage mechanism, return the latch bolt to the extended position.

11. The cylindrical lock of claim 10, wherein the access control signals are DC signals.

12. The cylindrical lock of claim 11, wherein the access control signals are 24 V DC signals.

* * * * *